United States Patent
Jang et al.

(10) Patent No.: US 7,817,236 B2
(45) Date of Patent: Oct. 19, 2010

(54) LIQUID CRYSTAL DISPLAY AND METHOD OF MANUFACTURING THE SAME

(75) Inventors: Yun Jang, Gyeonggi-do (KR); Chul Huh, Gyeonggi-do (KR); Jeong-Uk Heo, Gyeonggi-do (KR); Min-Sik Jung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 723 days.

(21) Appl. No.: 11/606,646

(22) Filed: Nov. 29, 2006

(65) Prior Publication Data
US 2007/0121054 A1    May 31, 2007

(30) Foreign Application Priority Data
Nov. 29, 2005    (KR)    ............ 10-2005-0114628

(51) Int. Cl.
*G02F 1/1339* (2006.01)
(52) U.S. Cl. .................. 349/153; 349/187; 349/190
(58) Field of Classification Search ............ 349/153, 349/155–157, 187, 190
See application file for complete search history.

(56) References Cited

U.S. PATENT DOCUMENTS

| | | | |
|---|---|---|---|
| 7,088,418 B1 * | 8/2006 | Yamashita et al. | 349/153 |
| 7,180,566 B2 * | 2/2007 | Lee | 349/154 |
| 7,271,872 B2 * | 9/2007 | Kim | 349/153 |
| 2003/0112405 A1 * | 6/2003 | Kim et al. | 349/156 |
| 2003/0117570 A1 * | 6/2003 | Kim | 349/153 |

* cited by examiner

*Primary Examiner*—Hemang Sanghavi
(74) *Attorney, Agent, or Firm*—Innovation Counsel LLP

(57) ABSTRACT

A display substrate includes a transparent plate and a liquid crystal dispersion adjuster. The display substrate includes a display area and a peripheral area surrounding the display area. The liquid crystal dispersion adjuster is formed in the peripheral area to modify the movement of the liquid crystal. The dispersion adjuster includes enhancing parts and a suppression part. The enhancing parts increase the dispersion of the liquid crystal, and the suppression part reduces the dispersion of the liquid crystal, thereby reducing non-filling area of the liquid crystal and the contamination of a seal-line.

28 Claims, 12 Drawing Sheets

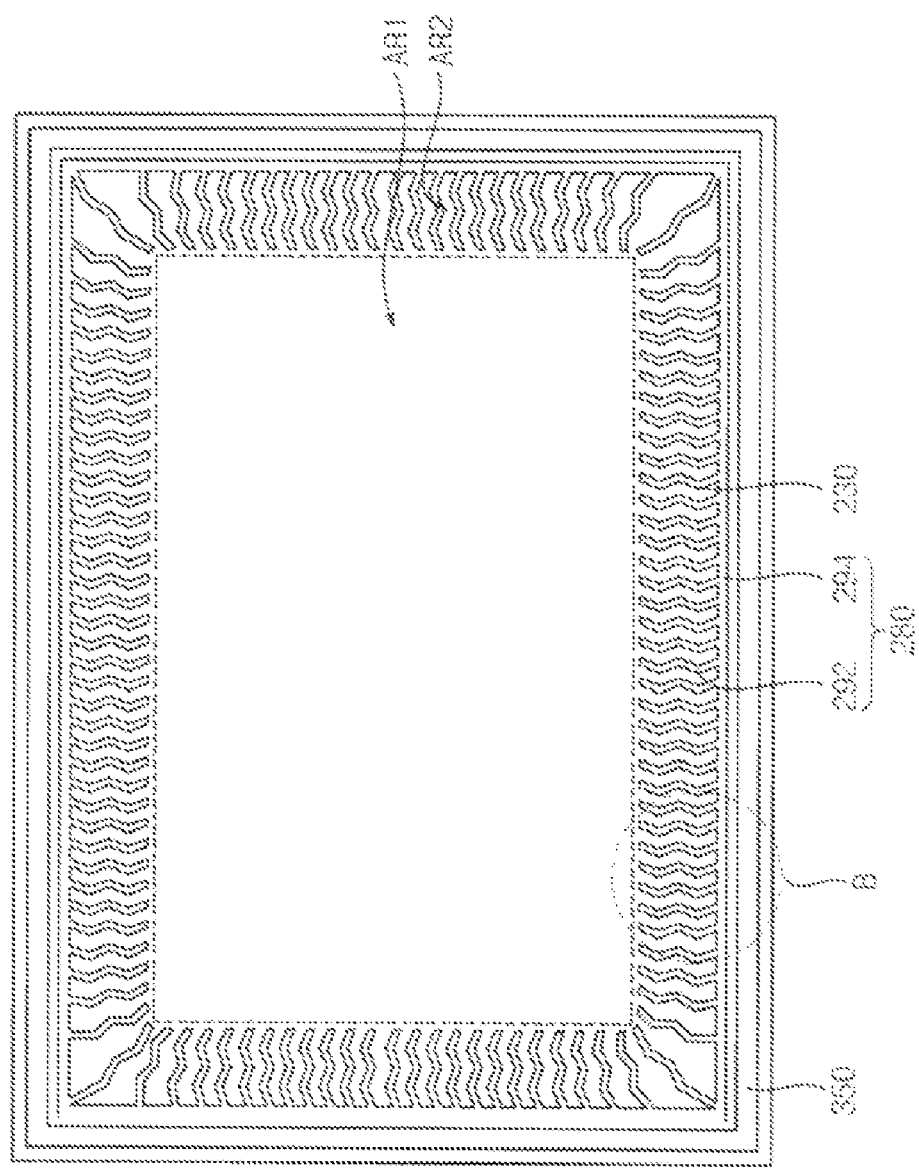

LIQUID CRYSTAL DISPLAY AND METHOD OF MANUFACTURING THE SAME

CROSS-REFERENCE TO RELATED APPLICATION

This application claims priority to Korean Patent Application No. 2005-114628 filed on Nov. 29, 2005, which is hereby incorporated herein by reference in its entirety.

BACKGROUND

1. Field of the Invention

The present invention relates generally to display substrates and display panels and methods of manufacturing the same, and in particular, to. color filter substrates and the display panels having the same for improving image quality.

2. Description of Related Art

A liquid crystal display (LCD) is widely used in flat panel displays. An LCD includes an LCD panel to display images and a back-light assembly to provide light to the LCD panel. The LCD panel includes an array substrate having thin film transistors (TFTs), a color filter substrate facing the array substrate, a color filter formed on the substrate, and a liquid crystal (LC) layer interposed therebetween. The LCD panel is divided into a display area and a peripheral area (i.e. non-display area).

The LCD panel includes a seal-line to seal the LC layer between the array substrate and the color filter substrate. The seal-line is disposed at the peripheral area.

Generally, the LC layer can be formed by two methods: injection and dropping. In the injection method, the LC is injected between the substrates in a vacuum by "capillary action". Whereas, in the dropping method, the seal-line is formed on one of two substrates, and then the LC is dropped on the other substrate in atmospheric pressure. The two substrates are assembled in a vacuum to form the LCD panel. The dropping method has an advantage of reducing manufacturing time.

Clumps of LC are dropped on the substrate, and the LC is dispersed on the substrate to form an LC layer when the other substrate is coupled thereto. The LC also disperses to contact the seal-line. However, if the LC contacts the seal-line before the seal-line is cured, the LC can be contaminated by the seal-line, which can cause image degradation in the vicinity of the seal-line. To reduce this LC contamination, the distance of the location for dropping the LC from the seal-line can be increased, but the increased distance can prevent the area to be completely filled with the LC, thereby degrading the image quality.

Accordingly, there is need for a display panel without the disadvantages of conventional LCDs discussed above.

SUMMARY

The present invention provides a display substrate and a display panel and a method for manufacturing the same, which may modify the movement of the LC and reduce the LC defects. In an exemplary display substrate according to the present invention, the display substrate includes a transparent plate and a liquid crystal dispersion adjuster. The display substrate can also include a black matrix and a color filter.

The transparent plate includes a display area and a surrounding peripheral area. The liquid crystal dispersion adjuster is formed in the peripheral area to modify the movement of the liquid crystal. The black matrix is disposed between the transparent plate and the liquid crystal dispersion adjuster to block light. The color filter is formed in the display area to allow specific colored light to pass.

The liquid crystal dispersion adjuster includes an enhancing portion to increase the movement of the LC and a suppression portion connected to the end of the enhancing portion to reduce the movement of the LC. A plurality of enhancing portions is formed, and each enhancing portion extends outward from the center of the transparent plate and is spaced apart from other enhancing portions.

In an exemplary display panel according to the invention, the display panel includes a first substrate and a second substrate facing with the first substrate, a liquid crystal layer interposed between the first substrate and the second substrate, and a seal-line.

The first substrate includes a plurality of thin film transistors. The second substrate includes a transparent plate having a display area and a peripheral area surrounding the display area, and a liquid crystal dispersion adjuster. The liquid crystal dispersion adjuster is formed in the peripheral area to modify the movement of the liquid crystal. The seal-line encloses the liquid crystal between the first substrate and the second substrate.

The first substrate or the second substrate can include a black matrix and a color filter to allow specific colored light to pass.

A method for manufacturing a display substrate in accordance with one embodiment of the present invention includes forming a transparent plate including a display area and a peripheral area to surround the display area, and forming a liquid crystal dispersion adjuster to modify the movement of the liquid crystal.

Forming the liquid crystal dispersion adjuster includes forming a black matrix in the peripheral area, forming a color filter in the display area, and forming the liquid crystal dispersion adjuster on the black matrix.

A method for manufacturing a display panel in accordance with another embodiment of the present invention includes forming a plurality of thin film transistors on a first substrate, forming a liquid crystal dispersion adjuster on a second substrate, forming a seal-line on one of the substrates, dropping a liquid crystal on the other substrate, and assembling the first substrate and the second substrate. One of the substrates can include a color filter.

According to embodiments of this invention, the liquid crystal dispersion adjuster can modify the dispersion of the LC, thereby reducing the liquid crystal contamination by the seal-line and the non-filling area by the liquid crystal to improve display image qualities. A better understanding of the above and many other features and advantages of the improved display panels of the present invention may be obtained from a consideration of the detailed description of the exemplary embodiments thereof below, particularly if such consideration is made in conjunction with the several views of the appended drawings, wherein like reference numerals are used to identify like elements illustrated in one or more of the figures thereof.

BRIEF DESCRIPTION OF THE DRAWINGS

The features of the present invention will become more apparent to those of ordinary skill in the art by describing in detail exemplary embodiments thereof with reference to the attached drawings, in which:

FIG. 4A is a plan view of a color filter substrate according to another embodiment of the present invention;

DETAILED DESCRIPTION

Figure 1:
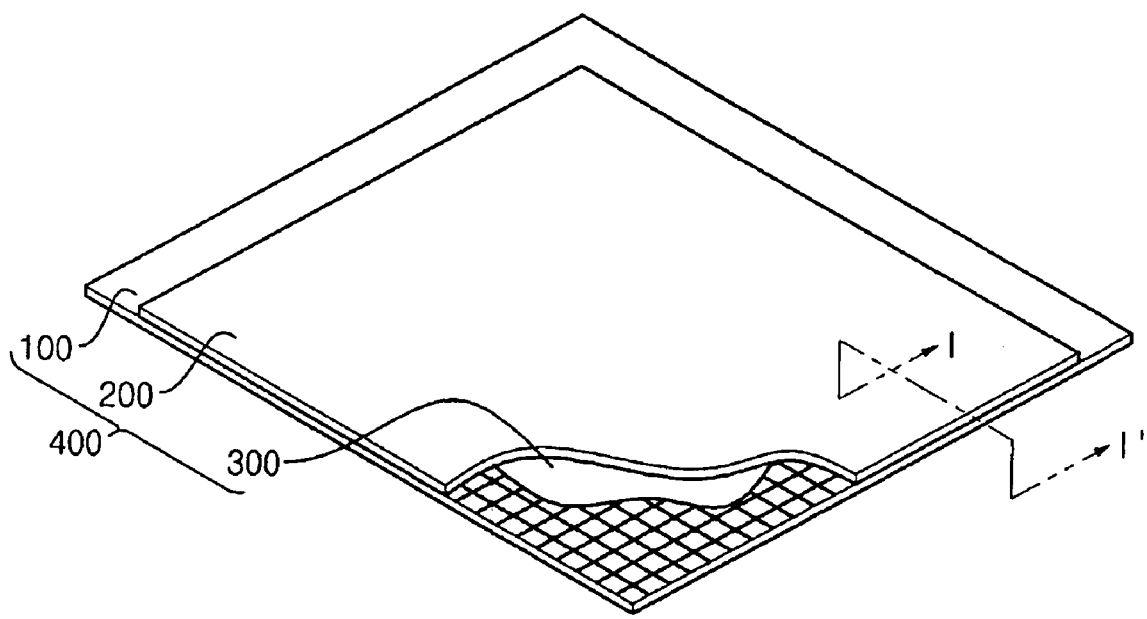
FIG. 1 is a perspective view of a display panel according to an embodiment of the present invention.
Figure 2:
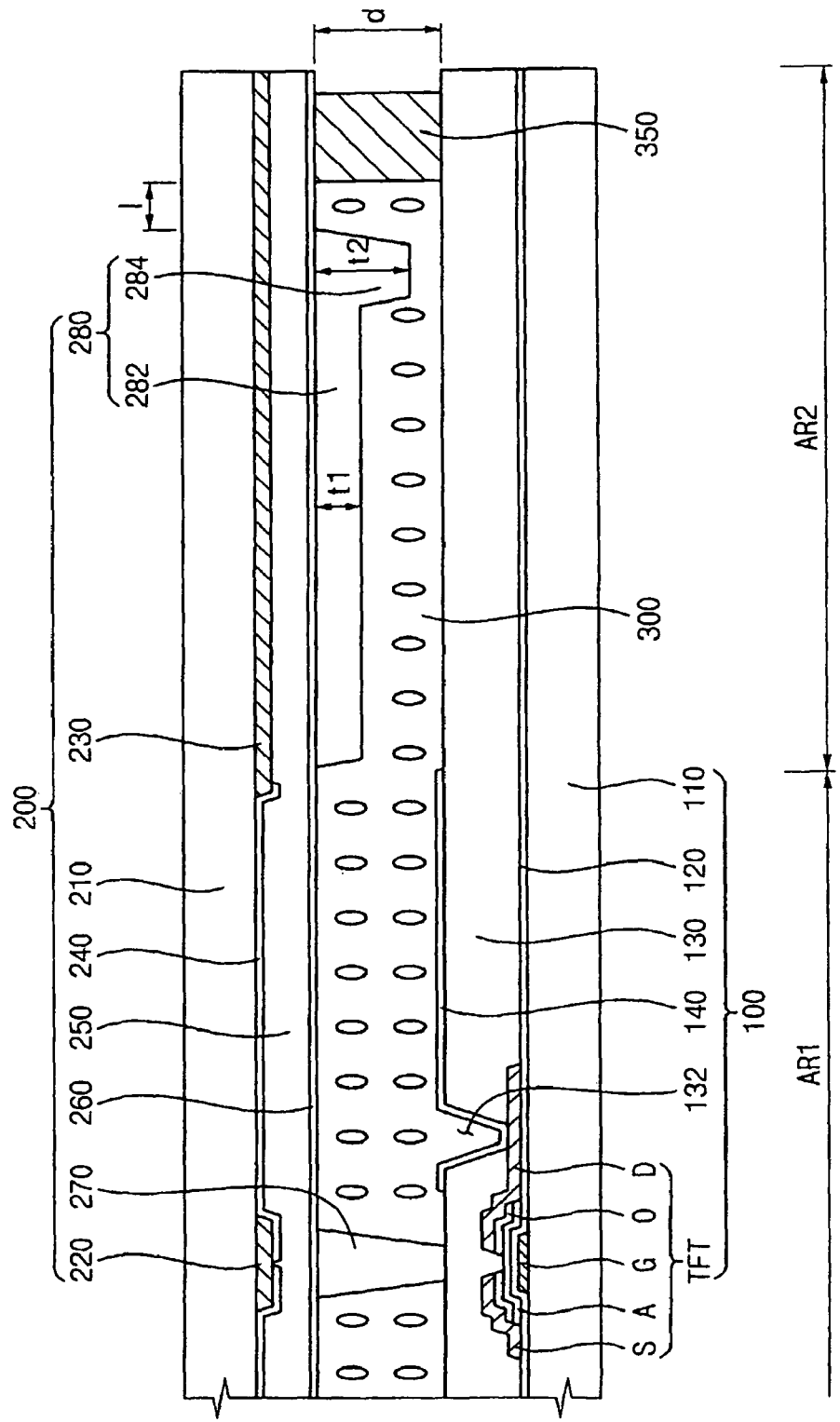
FIG. 2 is a cross-sectional view taken along the line I-I' of FIG. 1.

FIG. 1 is a perspective view of a display panel according to an embodiment of the present invention, and FIG. 2 is a cross-sectional view taken along the line I-I' of FIG. 1. Referring to FIGS. 1 and 2, a display panel 400 includes a first substrate 100, a second substrate 200, a liquid crystal (LC) layer 300 interposed therebetween, and a seal-line 350.

First substrate 100 includes a first transparent plate 110, gate lines (not shown), data lines (not shown), storage lines (not shown), a gate insulating layer 120, thin film transistors TFT, a passivation layer 130, and a pixel electrode 140. First substrate 100 is divided to a display area AR1 and a peripheral area AR2 surrounding display area AR1.

The gate lines and the data lines cross substantially at right angles to define a plurality of pixels on the display area AR1, and the storage lines extend parallel to the gate lines.

Each pixel includes a thin film transistor TFT and a pixel electrode 140. Thin film transistor TFT includes a gate electrode G, a source electrode S, a drain electrode D, an active layer A and an ohmic contact layer O.

Gate electrode G extends from the gate line. Source electrode S extends from the data line and overlaps a portion of gate electrode G. Drain electrode D is separated apart from source electrode S and overlaps a portion of gate electrode G. Drain electrode D is electrically connected to pixel electrode 140 through a contact hole 132.

Active layer A is formed between gate electrode G and source and drain electrodes S and D and covers gate electrode G. Ohmic contact layer O is disposed between active layer A and source and drain electrodes S and D to reduce contact resistance.

Pixel electrode 140 is formed of a transparent conductor such as indium tin oxide (ITO), indium zinc oxide (IZO), or amorphous indium tin oxide (a-ITO). A driving voltage is applied to pixel electrode 140 by a connected thin film transistor TFT. The storage line maintains the driving voltage during a frame.

The gate lines are formed on first transparent plate 110, which can be formed of glass, quartz, sapphire, or plastic such as polyester, poly acrylate, poly carbonate, or poly ether ketone. Gate electrodes G extend from the gate lines, and the storage lines are formed in parallel to the gate lines on first transparent plate 110.

Gate insulating layer 120 is formed on first transparent plate 110 to cover the gate lines, gate electrodes G, and storage lines. Gate insulating layer 120 is formed of a transparent insulating material such as silicon oxide or silicon nitride.

The data lines are formed on gate insulating layer 120 and extend across the gate lines. Source electrodes S extend from the data line. Drain electrodes D are formed apart from and on the same layer as source electrodes S.

Passivation layer 130 is formed on gate insulating layer 120 to cover thin film transistors TFT and includes contact holes 132 to expose a portion of drain electrode D.

Pixel electrodes 140 are formed on passivation layer 130 and electrically connected to drain electrodes D through contact holes 132.

Second substrate 200 faces first substrate 100 and is divided into a first area corresponding to display area AR1 and a second area corresponding to peripheral area AR2. Thus, hereinafter, the first and the second areas are represented with AR1 and AR2, respectively.

Second substrate 200 includes a second transparent plate 210 formed of the same material as first transparent plate 110, black matrices 220 and 230, a color filter 240, an overcoat or planarization layer 250, spacers 270, and a dispersion adjuster 280. The black matrices include inner black matrix 220 and outside black matrix 230.

Inner black matrix 220 is formed in first area AR1 to block light. In one embodiment, inner black matrix 220 is formed in the area corresponding to the gate lines, the data lines, the storage lines and thin film transistors TFT of first substrate 100, thereby preventing light from passing through the area.

Outside black matrix 230 is formed in second area AR2 to block light through the area. Black matrices 220 and 230 can be formed of an opaque inorganic material such as chromium (Cr).

Color filter 240 is formed in first area AR 1 of second transparent substrate 210 to cover portions of inner black matrixes 220. Color filter 240 can represent at least one of the primary colors: red, green, and blue.

Overcoat 250 is formed over the whole surface of second transparent plate 210 to cover color filter 240 and outer black matrix 230 and flatten uneven surfaces. Overcoat 250 can be formed of a transparent organic material.

A common electrode 260, such as a transparent conductor like indium tin oxide (ITO), indium zinc oxide (IZO), or amorphous indium tin oxide (a-ITO), is formed on overcoat 250. Common electrode 260 receives a common voltage to form an electric field in LC layer 300 with pixel electrodes 140.

Spacers 270 are formed on a portion of common electrode 260 to separate and maintain first substrate 100 and second substrate 200 at a pre-determined cell gap (d). In one embodiment, the cell gap (d) is about 3.8 μm.

Spacers 270 may be formed on common electrode 260 in the area corresponding to inner black matrix 220. Spacers 270 may be formed of a photo resist with a column shape of which the diameter decreases from second substrate 200 to first substrate 100.

Dispersion adjuster 280 is formed on common electrode 260 in second area AR2. For example, dispersion adjuster 280 can be formed in the area corresponding to outside matrix 230. Dispersion adjuster 280 adjusts the dispersion of LC layer 300 in second area AR2 (i.e. peripheral area). In one embodiment, dispersion adjuster 280 can include enhancing portions 282 to increase dispersion of LC layer 300 and a suppression portion 284 to reduce dispersion of LC layer 300.

LC layer 300 is interposed between first substrate 100 and second substrate 200. Voltages applied to pixel electrode 140 and the common electrode 260 generate an electric field in LC layer 300, which determines the orientation of LC molecules in the LC layer to adjust polarization of incident light. The polarized light passes through color filter 240 on second substrate 200 to display an image on display panel 400.

Seal-line 350, interposed between first substrate 100 and second substrate 200, is formed in second area AR2. Seal-line 350 is separated from dispersion adjuster 280 at a pre-determined distance. In one embodiment, the distance is about 0.1 mm to 0.3 mm, desirably, about 0.2 mm. Seal-line 350 includes a sealant to secure first substrate 100 to second substrate 200 and prevent the LC between first and second substrates 100 and 200 from leaking out.

Figure 3A:
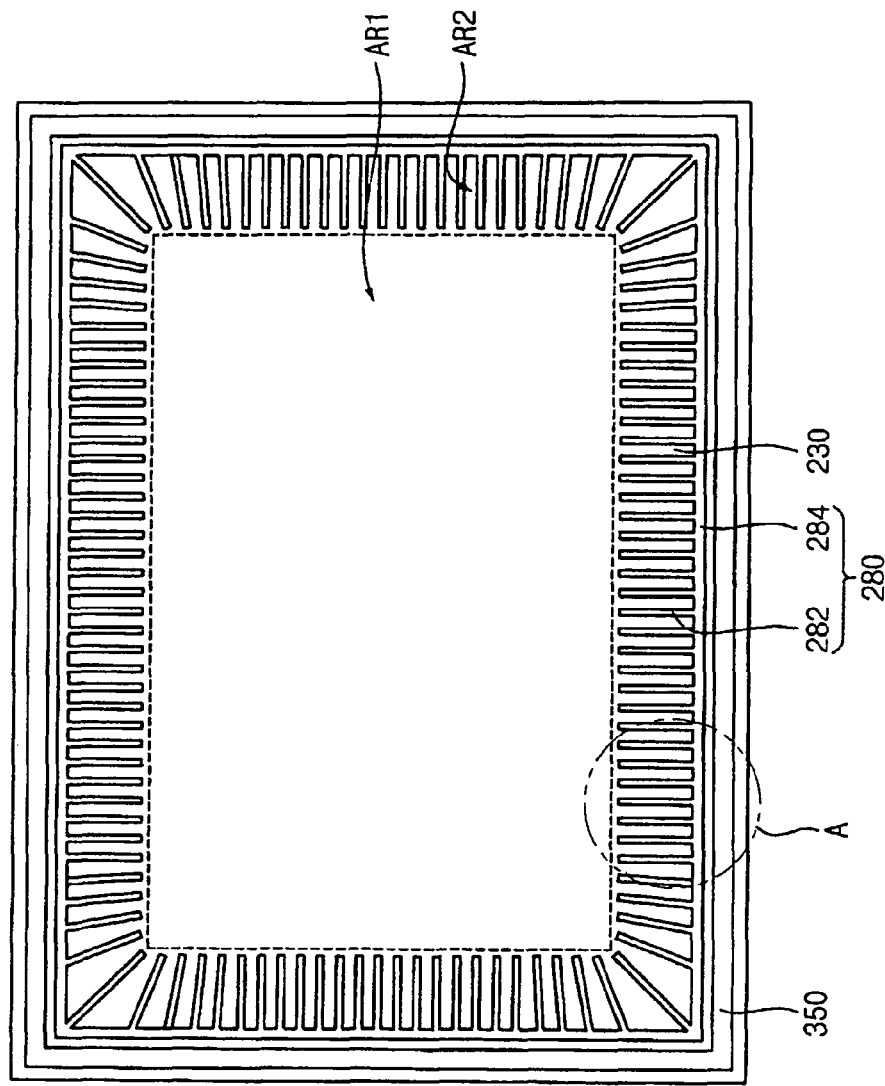
FIG. 3A is a plan view illustrating the color filter substrate of the display panel in FIG. 1.
Figure 3B:
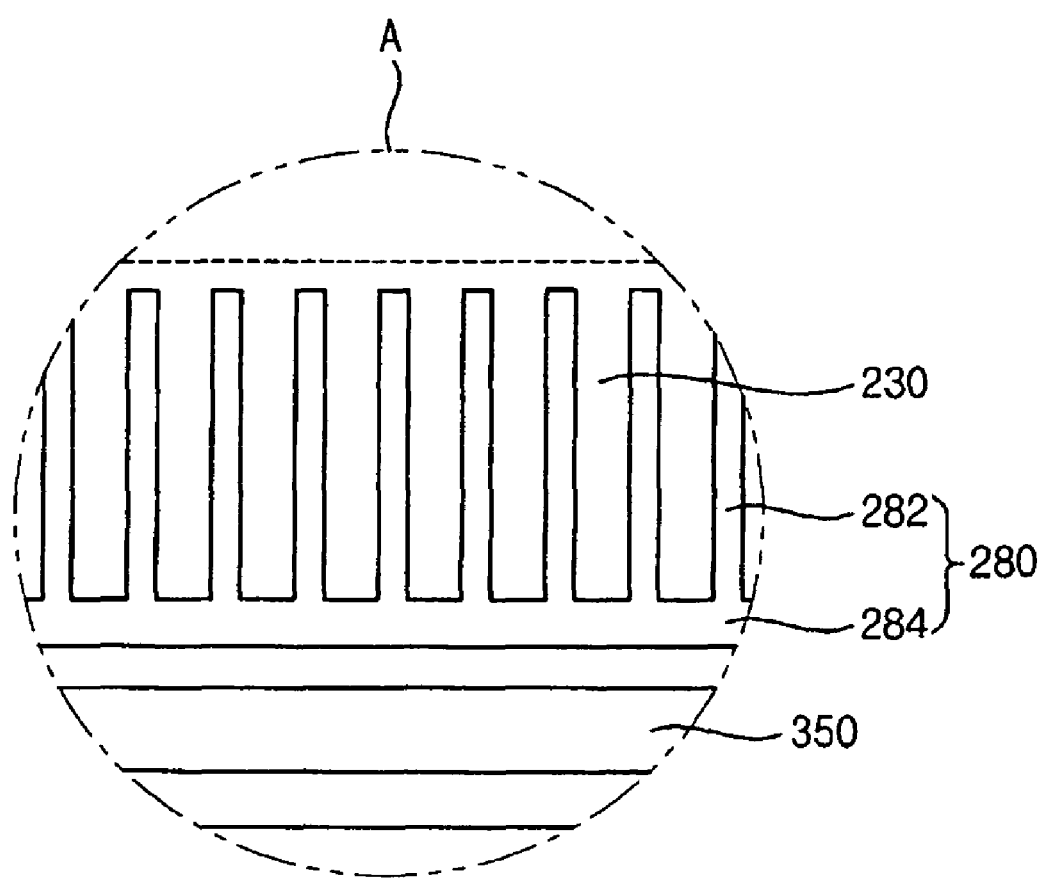
FIG. 3B is an enlarged detail view encircled by the dashed line "A" in FIG. 3A.

FIG. 3A is a plan view illustrating the color filter substrate of the display panel of FIG. 1, and FIG. 3B is an enlarged detail view encircled by the dashed line "A" in FIG. 3A.

Referring to FIGS. 2 to 3B, dispersion adjuster 280 determines dispersion of LC layer 300 in second area AR2 (i.e. peripheral area). Dispersion adjuster 280 includes enhancing portions 282 to increase dispersion of LC layer 300 and a suppression portion 284 to reduce dispersion of LC layer 300, where suppression portion 284 is thicker than enhancing portions 282.

Enhancing portions 282, formed on common electrode 260 in second area AR2, extend from suppression part 284 toward the center of the substrate and have a thickness t1. Each enhancing portion 282 is separated from one other by a predetermined distance, thereby providing a pathway for moving the LC to increase the movement of the LC. In one embodiment, the distance is 20 μm to 80 μm, e.g., about 50 μm.

The thickness t1 may be about 20% to 60%, e.g., 40%, of the cell gap d between first substrate 100 and second substrate 200 or about 20% to 80%, e.g., 50%, of the thickness t2 of suppression portion 284. In one embodiment, the thickness t1 is about 1.2 μm to 1.3 μm.

Suppression portion 284 is connected to the ends of enhancing portions 282 to reduce the dispersion of the LC. Suppression portion 282 extends at right angles to and is thicker than enhancing portion 282, thereby blocking the pathway for moving the LC and suppressing the movement of the LC.

The thickness t2 of suppression portion 284 can be about 60% to 100%, e.g., 80%, of the cell gap d between first substrate 100 and second substrate 200. Suppression portion 284 can be separated from seal-line 350 by about 0.1 mm to 0.3 mm, e.g., about 0.2 mm.

Thus, since enhancing parts 282 are separated apart from one another and in parallel with the outward flow of the LC, a pathway is provided for quickly moving the LC outward and reduce or eliminate non-filled areas. Also, since suppression portion 284 is perpendicular to the outward flow of the LC and separated from seal-line 350, the outward flow of the LC to seal-line 350 is reduced. An uncured seal-line may diffuse inward toward the LC, which can contaminate the LC on contact. Because suppression portion 284 reduces outward flow to seal-line 350 and may prevent an uncured seal-line from contacting the LC, contamination caused uncured seal-line 350 contacting the LC may be reduced or eliminated.

This embodiment includes second substrate 200 with the black matrices and the color filters. However, in another embodiment, first substrate 100 can include the black matrices and the color filters, that is, first substrate 100 or panel 400 can have a color filter on array (COA) or other structure.

Figure 4B:
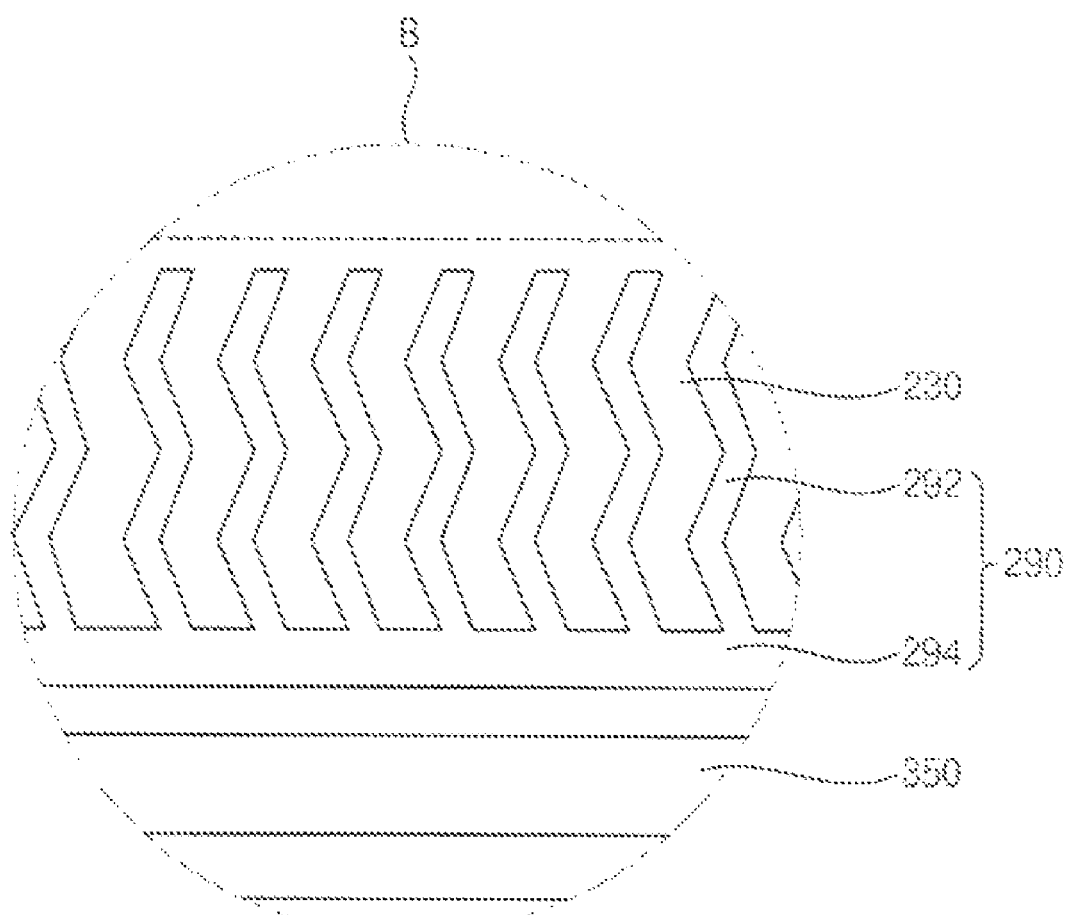
FIG. 4B is an enlarged detail view encircled by the dashed line "B" in FIG. 4A.

FIG. 4A is a plan view of a color filter substrate according to another embodiment of the present invention, and FIG. 4B is an enlarged detail view encircled by the dashed line "B" in FIG. 4A.

The color filter substrate is substantially identical to the color filter shown in FIGS. 1 to 3B except for the shape of the dispersion adjuster and in particular for the shape of the enhancing portion.

A dispersion adjuster 290 includes enhancing portions 292 and a suppression portion 294. Enhancing portions 292 extend outward in zigzags from the center of second substrate 200. In another embodiment, enhancing portions 292 can extend in curves. All other elements of the substrate are the same as the embodiment of FIGS. 1 to 3B.

The straight line shaped enhancing portions provide the greatest increase in LC dispersion, followed by the curve shape, with the zigzag shape providing the lowest increase in LC dispersion of the three shapes.

FIGS. 5 to 9 show various steps in a method for manufacturing a display panel according to an embodiment of the present invention.

Figure 5:
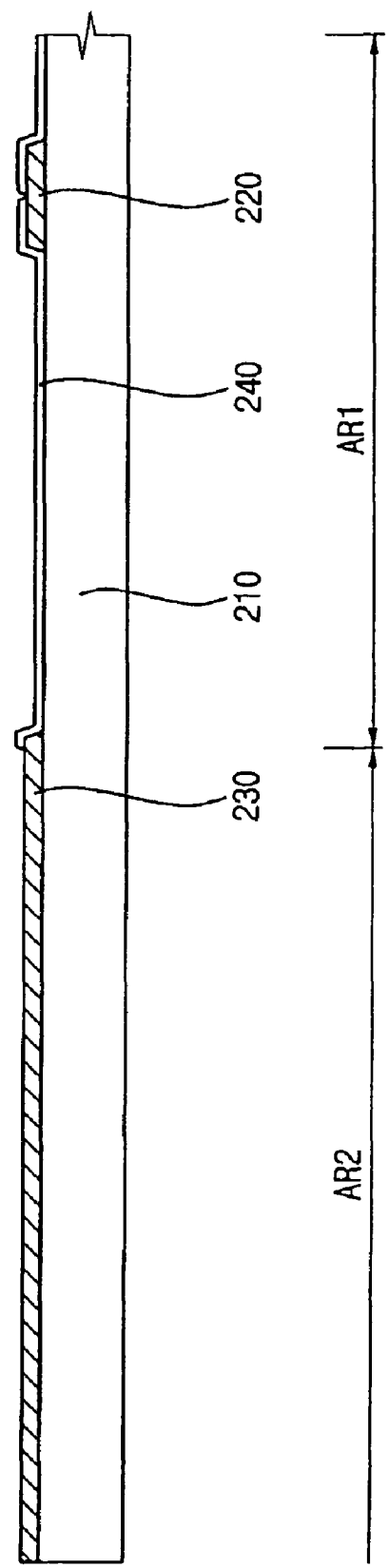
FIGS. 5 to 9 are cross-sectional views showing various process steps for forming a display panel according to an embodiment of the present invention.

FIG. 5 illustrates a step of forming black matrices and color filters on the second plate. Referring to FIG. 5, black matrices, i.e. inner and outside black matrices 220 and 230, are formed on second transparent plate 210, which is divided to a first area AR1 to display images and a second area AR2 (i.e. peripheral area). Inner black matrix 220 is disposed in a portion of first area AR1, and outside black matrix 230 is disposed in second area AR2. The black matrices can be formed of organic material such as photo resist or inorganic material such as chromium (Cr). Organic black matrices can be formed by photolithography and inorganic black matrices by sputtering. Color filters 240 are formed on second transparent plate 210 and a portion of the black matrices, such as by photolithography, inkjet printing, or roller printing. Color filters 240 include at least one filter of the primary colors red, green, and blue.

Figure 6:
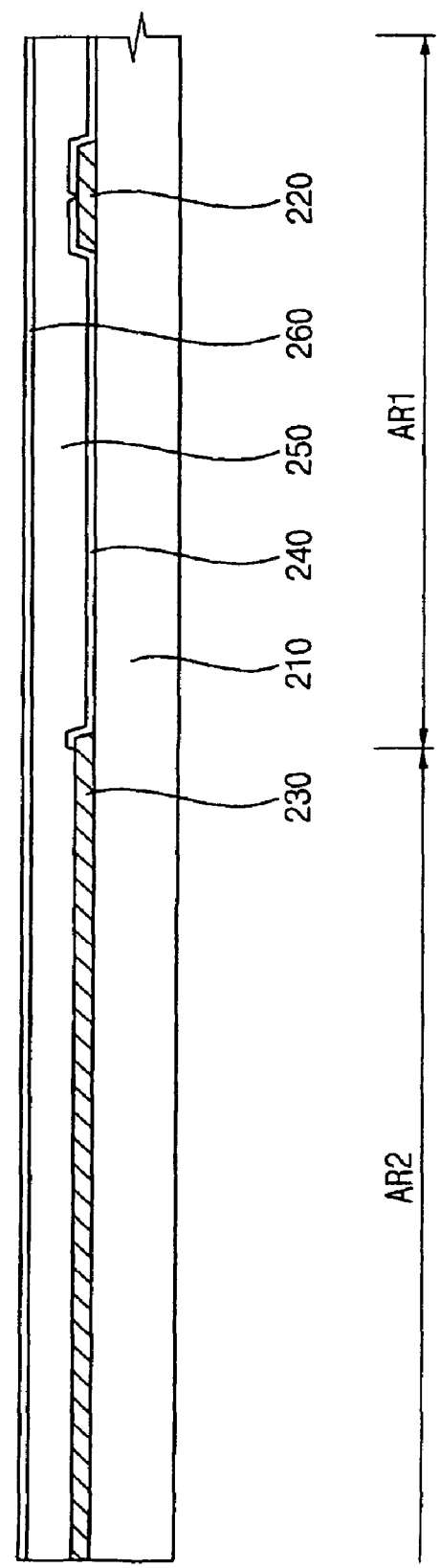

In FIG. 6, overcoat 250 is formed on inner black matrix 230, outside black matrix 240, and color filters 240 to provide a flattened surface. Overcoat 250 can be formed of a transparent organic insulating layer. Common electrode 260, which can be a transparent conductor such as indium tin oxide (ITO), indium zinc oxide (IZO), or amorphous indium tin oxide (a-ITO), is then formed on overcoat 250.

Figure 7:
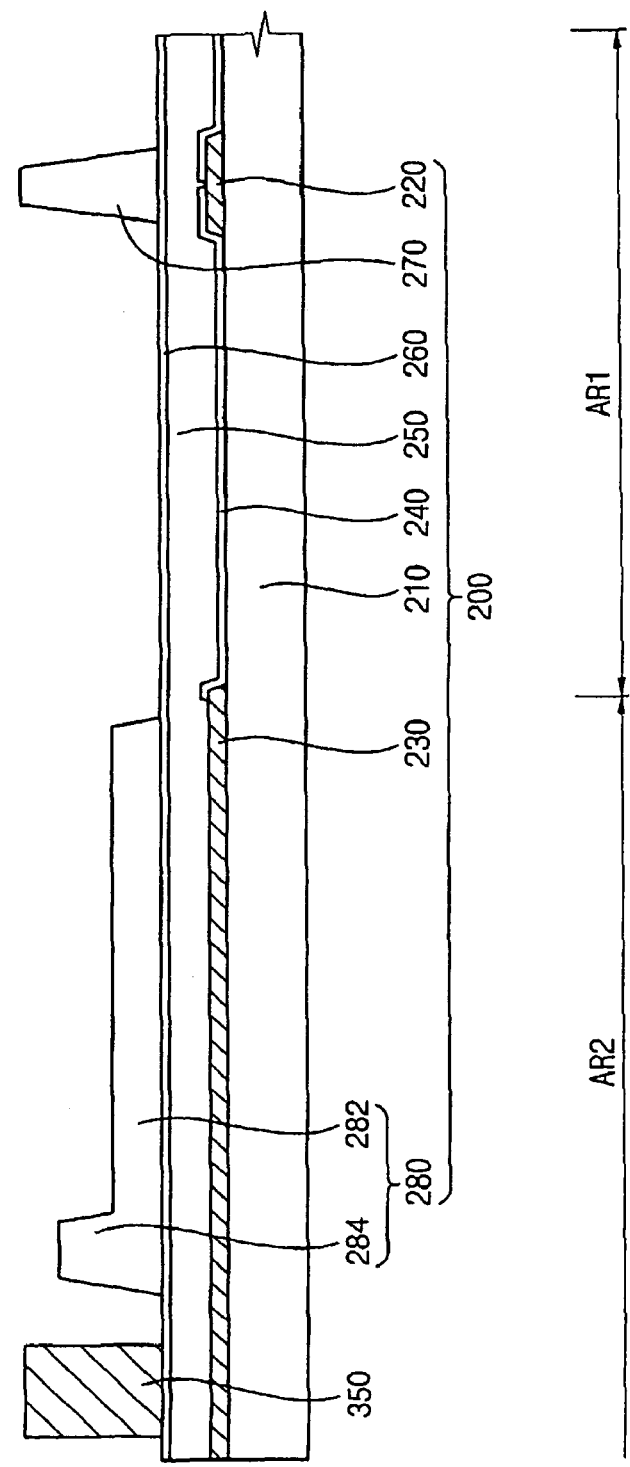

In FIG. 7, spacers 270 and dispersion adjuster 280 are formed on common electrode 260. Spacers 270 are formed in the area corresponding to inner black matrices 220, and dispersion adjuster 280 is formed in the area corresponding to outside black matrices 230. Dispersion adjuster 280 includes enhancing portions 282 to increase the dispersion of the LC and suppression portion 284 connected to the ends of enhancing portions 282 to reduce the dispersion of the LC.

Spacers 270 can be formed of photo resist such as acryl photoresist. Spacers 270 and dispersion adjuster 280 can be formed by photo lithography, which can form different sizes and shapes by using a slit or halftone mask and/or adjusting a distance between a mask and an exposed material to light.

Figure 8A:
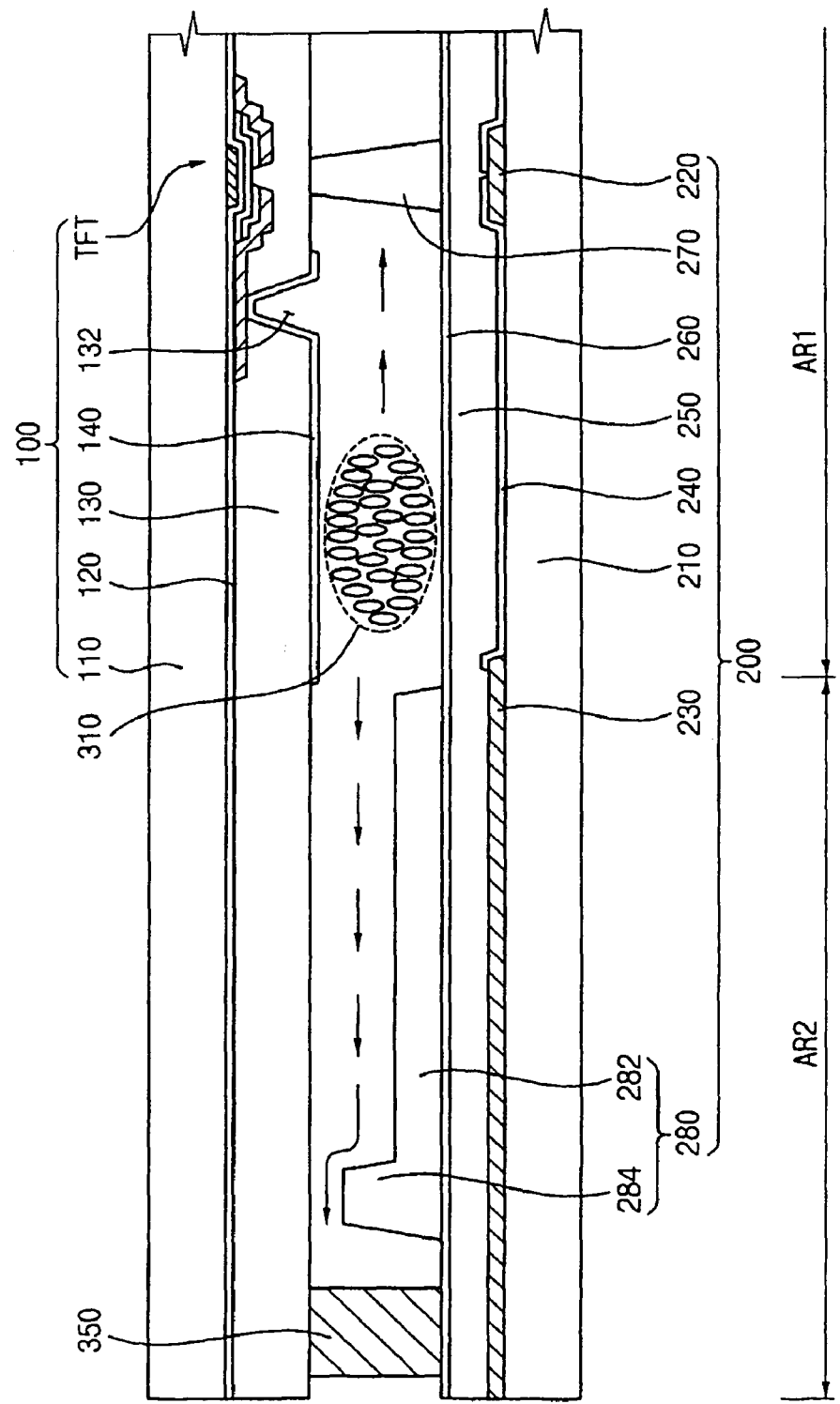
Figure 8B:
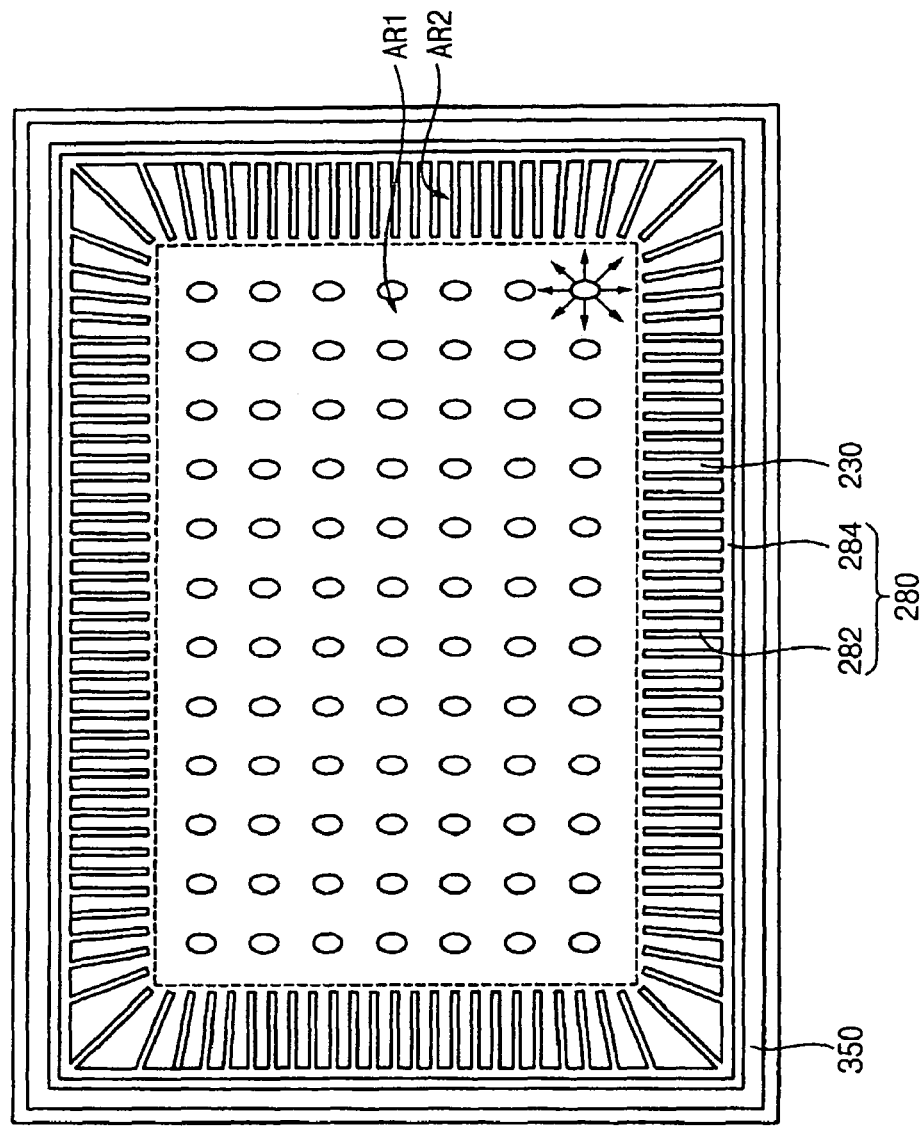

In FIGS. 8A and 8B, a plurality of thin film transistors (TFTs) is formed on first substrate 100. Seal-line 350 is formed on first substrate 100 or second substrate 200 (FIG. 7). LC droplets 310, each having a large aggregation of LC molecules, are dropped on the other substrate. The LC droplet means an aggregation of LC molecules.

In one embodiment, seal-line 350 is formed on second substrate 200, and LC droplets 310 are dropped on first substrate 100. Seal-line 350 is formed on common electrode 260 corresponding to outside black matrices 230 and is separated from dispersion adjuster 280 at a determined distance, for example, about 0.2 mm. LC droplets 310 are dropped in different portions of first area AR1, either sequentially, at once, or a combination thereof. The LC droplets begin to disperse, as shown by the arrows in FIGS. 8A and 8B. First substrate 100 and second substrate 200 are then coupled to each other by seal-line 350, such as in a vacuum.

Figure 9:
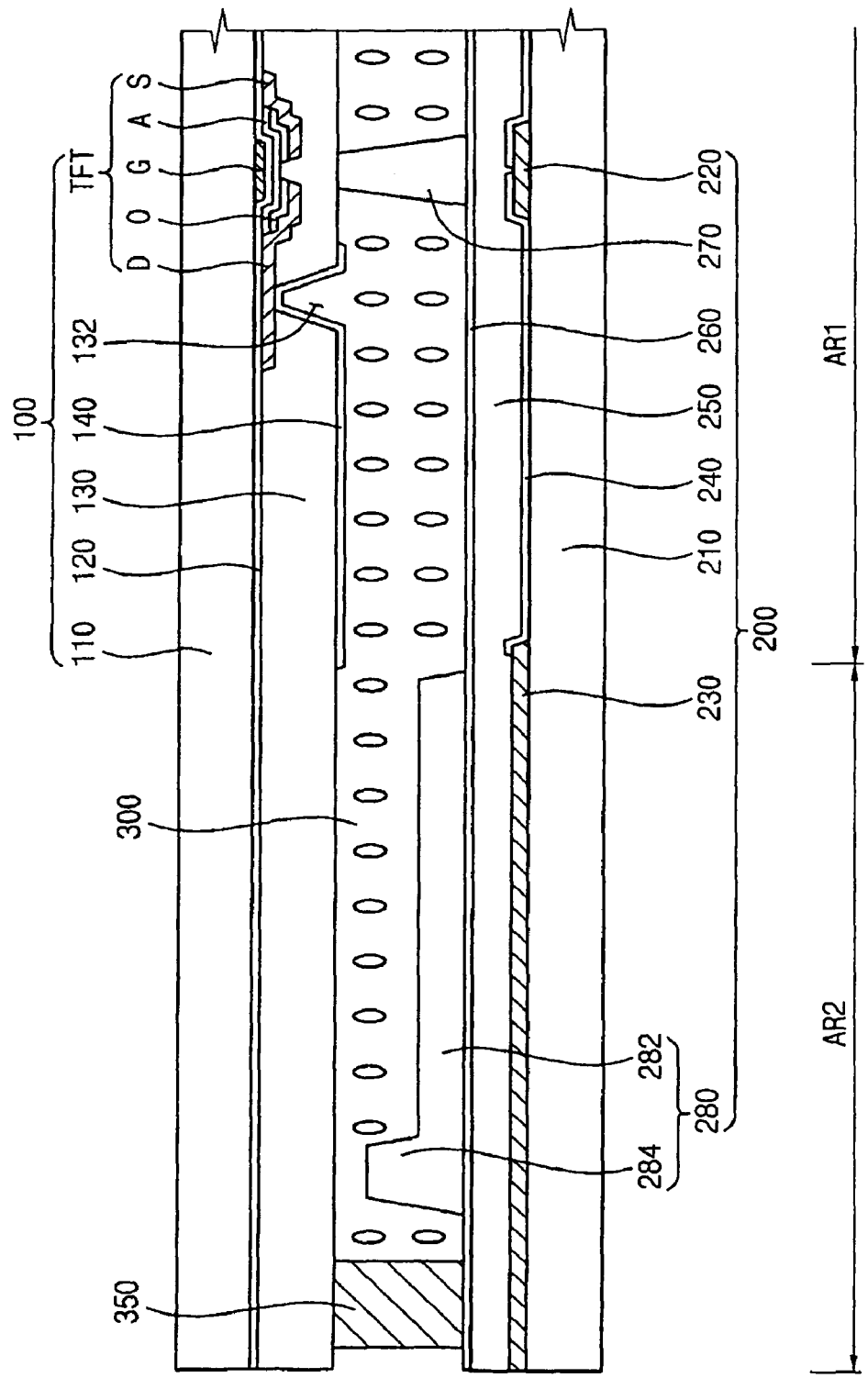

FIG. 9 illustrates a step of forming a LC layer after the LC dispersion. The display panel of FIG. 9 is substantially identical to the display panel of FIG. 2 except for the position of the first and second substrates. Identical reference numbers refer to identical elements, so redundant explanation will be skipped. As shown in FIG. 9, after combining first substrate 100 and second substrate 200, the LC droplets are dispersed to form LC layer 300 between first substrate 100 and second substrate 200. The LC disperses to second area AR2 faster due to enhancing portion 282. The dispersion of the LC is reduced or stopped by suppression portion 284.

This embodiment includes second substrate 200 with the black matrices and the color filters. However, in another embodiment, first substrate 100 can include the black matrices and the color filters, that is, first substrate 100 can have a color filter on array (COA) structure or other suitable structure.

Accordingly, the embodiments of the present invention provide the dispersion adjuster including enhancing portions and a suppression portion. The enhancing portions increase the movement of the LC, thereby reducing the number and/or extent of non-filling areas of the LC. The suppression portion reduces the movement of the LC, thereby preventing a contamination of the seal-line by the LC.

As those of skill in this art will appreciate, many modifications, substitutions and variations can be made in the materials, apparatus, configurations, and methods of the present invention without departing from its spirit and scope. In light of this, the scope of the present invention should not be limited to that of the particular embodiments illustrated and described herein, as they are only exemplary in nature, but instead, should be fully commensurate with that of the claims appended hereafter.

What is claimed is:

1. A display substrate comprising:
a transparent plate having a display area and a peripheral area surrounding the display area; and
a liquid crystal dispersion adjuster formed in the peripheral area to modify the movement of liquid crystal,
wherein the liquid crystal dispersion adjuster includes an enhancing part to increase the movement of a liquid crystal in the peripheral area and a suppression part connected to the end of the enhancing part to reduce the movement of the liquid crystal in the peripheral area.

2. The display substrate of claim 1, wherein the enhancing part comprises a plurality of enhancing portions, with each enhancing portion extending outward to a periphery of the transparent plate and spaced apart from adjacent enhancing portions at a pre-determined distance.

3. The display substrate of claim 2, wherein each of the plurality of enhancing portions is zigzag shaped.

4. The display substrate of claim 2, wherein each of the plurality of enhancing portions is curved.

5. The display substrate of claim 2, wherein the pre-determined distance ranges from approximately 20 μm to approximately 80 μm.

6. The display substrate of claim 2, wherein the enhancing portions have a thickness approximately 1.2 μm to approximately 1.3 μm.

7. The display substrate of claim 1, wherein the suppression part crosses the enhancing part.

8. The display substrate of claim 7, wherein the suppression part is approximately perpendicular to the enhancing part.

9. The display substrate of claim 1, wherein the enhancing part has a first thickness and the suppression part has a second thickness, wherein the second thickness is thicker than the first thickness.

10. The display substrate of claim 1, wherein the liquid crystal dispersion adjuster comprises a photoresist.

11. The display substrate of claim 1, further comprising a black matrix disposed between the transparent plate and the liquid crystal dispersion adjuster.

12. The display substrate of claim 1, further comprising a seal-line formed on the black matrix and separated from the liquid crystal dispersion adjuster by a pre-determined distance.

13. The display substrate of claim 12, the seal-line is separated from the liquid crystal dispersion adjuster by approximately 0.1 mm to approximately 0.3 mm.

14. The display substrate of claim 1, further comprising a color filter in the display area.

15. The display substrate of claim 14, further comprising a common electrode over the color filter, wherein the common electrode comprises a transparent conductor.

16. The display substrate of claim 15, further comprising an overcoat between the color filter and the common electrode.

17. A display panel, comprising:
a first substrate having a plurality of thin film transistors;
a second substrate facing with the first substrate;
a liquid crystal layer between the first and second substrates; and,
a seal-line along a periphery of and between the first substrate and the second substrate to enclose the liquid crystal layer,
wherein the second substrate comprises a transparent plate having a display area and a peripheral area surrounding the display area, and a liquid crystal dispersion adjuster formed in the peripheral area to modify the movement of the liquid crystal, the liquid crystal dispersion adjuster includes a plurality of enhancing parts to increase the movement of the liquid crystal and a suppression part connected to ends of the enhancing parts to reduce the movement of the liquid crystal.

18. The display panel of claim 17, wherein the suppression part has the second thickness, and the second thickness is about 60% to 100% of a cell gap between the first substrate and the second substrate.

19. The display panel of claim 17, wherein the enhancing part has the first thickness, and the first thickness is about 20% to 60% of a cell gap between the first substrate and the second substrate.

20. The display panel of claim 17, wherein the enhancing part has the first thickness, and the first thickness is about 20% to 80% of the second thickness.

21. The display panel of claim 17, wherein the seal-line is along a periphery of the peripheral area and is separated from the liquid crystal dispersion adjuster by a pre-determined distance.

22. The display panel of claim 21, wherein the seal-line is separated from the liquid crystal dispersion adjuster by approximately 0.1 mm to approximately 0.3 mm.

23. The display panel of claim 17, further comprising a spacer to maintain a gap between the first and second substrates.

24. The display panel of claim 23, wherein the spacer comprises substantially the same material as the liquid crystal dispersion adjuster.

25. The display panel of claim 17, wherein the second substrate further comprises a black matrix between the transparent plate and the liquid crystal dispersion adjuster.

26. The display panel of claim 17, wherein the second substrate further comprises a color filter in the display area.

27. The display panel of claim 17, wherein the first substrate further comprises a black matrix between the transparent plate and the liquid crystal dispersion adjuster.

28. The display panel of claim 17, wherein the first substrate further comprises a color filter in the display area.

* * * * *